(12) United States Patent
Oyaski

(10) Patent No.: US 6,771,946 B1
(45) Date of Patent: Aug. 3, 2004

(54) METHOD OF PREVENTING CELL PHONE USE WHILE VEHICLE IS IN MOTION

(76) Inventor: Michael F. Oyaski, 207 E. Highland Ave., Ebensburg, PA (US) 15931

(*) Notice: Subject to any disclaimer, the term of this patent is extended or adjusted under 35 U.S.C. 154(b) by 501 days.

(21) Appl. No.: 09/629,915

(22) Filed: Jul. 31, 2000

(51) Int. Cl.$^7$ .............................................. H05K 11/02
(52) U.S. Cl. ......................... 455/345; 455/99; 340/936
(58) Field of Search ................................ 455/345, 414, 455/575, 96, 99, 456.4; 340/904, 905, 933, 936, 438

(56) References Cited

U.S. PATENT DOCUMENTS

| | | | | |
|---|---|---|---|---|
| 4,914,434 A | * | 4/1990 | Morgan et al. ............. | 340/906 |
| 4,931,793 A | * | 6/1990 | Fuhrmann et al. .......... | 340/903 |
| 5,255,306 A | * | 10/1993 | Melton et al. ................ | 379/38 |
| 5,796,338 A | * | 8/1998 | Mardirossian .............. | 455/134 |
| 6,222,458 B1 | * | 4/2001 | Harris ........................ | 455/528 |
| 6,297,768 B1 | * | 10/2001 | Allen, Jr. ................. | 342/357.1 |
| 6,496,703 B1 | * | 12/2002 | da Silva ................... | 455/456.4 |
| 6,647,268 B1 | * | 11/2003 | Tsuchida et al. ............ | 340/988 |

FOREIGN PATENT DOCUMENTS

JP      10-294970 A    * 11/1998

* cited by examiner

*Primary Examiner*—Edward F. Urban
*Assistant Examiner*—Thuan T. Nguyen
(74) *Attorney, Agent, or Firm*—James Ray & Associates (57) ABSTRACT

The present invention provides a method for preventing a driver of a motor vehicle from using a cellular telephone while the motor vehicle is in motion. The invention comprises a step of determining a position of the gear shift lever in such motor vehicle and generating a first signal when the position of such gear shift lever is moved to and remains in one of drive, overdrive, second, low, and reverse. Another step involves transmitting such signal generated in a previous step to a means disposed in a predetermined location on such motor vehicle for generating a reverse phase signal. Another step involves generating such reverse phase signal when such first signal is received by such means. A next step is transmitting such reverse phase signal for a predetermined radius from such predetermined location. A last step is preventing any cellular telephone transmission within such predetermined radius when such reversed phase frequency signal is being transmitted.

28 Claims, 5 Drawing Sheets

FIG. 7

METHOD OF PREVENTING CELL PHONE USE WHILE VEHICLE IS IN MOTION

FIELD OF THE INVENTION

The present invention relates, in general, to cellular telephones being used in motor vehicles and, more particularly, this invention relates to a method of preventing a driver of a motor vehicle from using a cellular telephone while such motor vehicle is in motion.

BACKGROUND OF THE INVENTION

The use of cell phones in automobiles and other motor vehicles has grown to alarming proportions in recent years. What was once used as an auxiliary piece of emergency equipment in a vehicle has now become a common and potentially dangerous appliance in a vehicle. Usage of the phone has increased dramatically in recent years. Not only has there been a significant increase in the number of cell phones in vehicles but the use of the phones has also seen a dramatic change.

Drivers are using the cell phones for many different reasons. Whether its a salesman checking in at the office on the order of business or a person just calling home or calling a friend, cell phones are being used at a significantly increased rate. Many, many phones are being used by drivers while their vehicles are moving and not just moving but traveling at high speeds. Cellular telephones are being used by drivers even on high speed interstate highways.

The use of cell phones has become such a problem that many state legislatures and even the federal government are considering passing legislation to curb the use of cell phones while the vehicle is moving. However, as with many laws such as those which require seat beat use, this type of law is very difficult to enforce.

There is a growing need for some piece of equipment that can be mounted in a vehicle which can prevent the use of the cell phone by the driver while the vehicle is moving.

SUMMARY OF THE INVENTION

In a first embodiment the present invention provides a method for preventing a driver and/or operator of a motor vehicle from using a cellular telephone while the motor vehicle is in motion. The invention comprises a step of determining a position of the gear shift lever disposed in a first predetermined location on such motor vehicle and generating a first signal when the position of such gear shift lever is moved to and remains in a position of one of drive, overdrive, second, low, and reverse. Another step involves transmitting such first signal generated in a previous step to a means disposed in a second predetermined location on such motor vehicle for generating a reverse phase signal. Another step involves generating such reverse phase signal when such first signal is received by such means. A next step is transmitting such reverse phase signal for a predetermined radius from such second predetermined location. A last step is preventing any cellular telephone transmission within such predetermined radius while such reversed phase frequency signal is being transmitted.

Another embodiment of the invention requires a modification to present cell phones. This method for preventing a driver of a motor vehicle from using a cellular telephone while the vehicle is in motion comprises a first step of determining a position of a gear shift lever disposed in a predetermined location on such motor vehicle and generating a first signal when such gear shift lever is moved to and remains in one of drive, overdrive, second, low and reverse. Another step involves transmitting such first signal, generated in a previous step, to a receiving and transmitting means disposed in a second predetermined location on such motor vehicle for generating a second signal. The next step involves generating a second signal when such first signal is received by such receiving and transmitting means for generating the second signal and then transmitting such second signal for a predetermined radius from such second predetermined location. Another step is receiving such second signal by an AM receiver section of a cellular telephone and, finally, preventing any cellular telephone transmission within such predetermined radius while such second signal is being received by such AM receiver section of such cellular telephone.

Another alternative embodiment of the invention includes an apparatus for preventing a motor vehicle driver from using a cellular telephone while such motor vehicle is in motion. Such apparatus comprises a first means disposed in a first predetermined location on such motor vehicle for determining a position of gear shift lever of such motor vehicle and for generating and transmitting a first signal when such gear shift lever is moved to and remains in a position of one of drive, overdrive, second, low and reverse. There is a phase reversal generator and transmitter disposed at a second predetermined location on such motor vehicle for receiving such first signal transmitted by such first means and for generating and transmitting a reverse phase output signal when such phase reversal generator and transmitter is activated by such first signal. A second means is disposed on such phase reversal generator and transmitter for controlling transmission of the reverse phase power output signal of such phase reversal generator and transmitter so as to transmit such reverse phase power output signal for a predetermined radius. Such reverse phase power output signal from such phase reversal generator and transmitter prevents any cellular telephone transmission within such predetermined radius while such phase reversal generator and transmitter is transmitting such reverse phase power output signal.

Still another alternative embodiment of the invention provides a method for preventing a driver of a motor vehicle from using a cellular telephone while the motor vehicle is in one of a forward motion and a reverse motion. The method comprises the steps of determining a position of a gear shift lever that is disposed in a first predetermined location on the motor vehicle and generating a first signal when the gear shift lever is moved to and remains in a position, determined in a previous step, which will allow the motor vehicle to move into one of a forward motion and a reverse motion. There is a step of transmitting such first signal to a receiving and transmitting means disposed in a second predetermined location on the motor vehicle for enabling such receiving and transmitting means to generate a second signal. Another step involves generating and transmitting a third signal from such cellular telephone, within a predetermined radius, to such receiving and transmitting means indicating that such cellular telephone is transmitting thereby activating such receiving and transmitting means which had been enabled in a previous step to generate a second signal when the receiving and transmitting means also receives such third signal that such cellular telephone is transmitting. There is a step of generating such second signal by such receiving and transmitting means when such first signal, generated in a previous step, and such third signal, also generated in a previous step, are both received by such receiving and transmitting means for generating such second signal. The next step is transmitting such second signal for a predetermined radius from such second predetermined location with a message to such cellular telephone within the predetermined radius telling such cellular telephone user that within a predetermined time one of such driver must stop cellular telephone transmission or such motor vehicle would be shut down. The final step involves shutting down such motor vehicle if such cellular telephone transmission has not ceased within the predetermined time.

Yet another alternative embodiment provides a method for preventing a motor vehicle driver from using a cellular phone while such motor vehicle is in motion. Such method comprises determining a speed of such motor vehicle and generating a first signal when such speed of such motor vehicle exceeds a predetermined speed. There is a step of transmitting the first signal, generated in a previous step, to a means disposed in a predetermined location on such motor vehicle for generating a reverse phase signal and then generating such reverse phase signal when the first signal is received by the means for generating the reverse phase signal. There is then a step of transmitting the reverse phase signal for a predetermined radius from such predetermined location and, finally, preventing any cellular telephone transmission substantially within the predetermined radius while the reverse phase signal is being transmitted.

Still another alternative embodiment of the invention provides a method for preventing a driver of a motor vehicle from using a cellular telephone while the motor vehicle is in motion. The invention comprises a step of determining one of a position of the gear shift lever and an ignition switch by a first means disposed in a first predetermined location on such motor vehicle There is a step of generating a first signal by said first means when the position of one of such gear shift lever is moved to and remains in a position of one of drive, overdrive, second, low, and reverse and such ignition switch is moved to an on position. Another step involves transmitting such first signal generated in a previous step to a second means disposed in a second predetermined location on such motor vehicle for generating a reverse phase signal.

Another step involves generating such reverse phase signal when such first signal is received by such second means. A next step is transmitting such reverse phase signal for a predetermined radius from such second predetermined location. A last step is preventing any cellular telephone transmission within such predetermined radius while such reversed phase frequency signal is being transmitted.

In still yet another alternative embodiment of the invention there is provided in combination with a cellular telephone that is used for wireless communication, an improvement comprising a first means or device disposed one of on and within such cellular telephone for transmitting a short range signal for a distance of up to about 3 feet. Such short range signal activates a second means that is disposed closely adjacent a driver of a motor vehicle. Such second means generates and transmits a signal which will prevent cellular telephone transmission.

Another alternative embodiment of the invention provides a method for preventing a driver of a motor vehicle from using a cellular telephone while such motor vehicle is in a mode which would enable such motor vehicle to move in any direction. Such method comprises the steps of determining a position of an ignition switch by a first means disposed in a first predetermined location on such motor vehicle and generating a first signal when such ignition switch is determined to have been moved to an on position.

There is a step of transmitting such first signal to a second means disposed in a second predetermined location on said motor vehicle for generating a reverse phase signal. There is a step of generating such reverse phase signal by the second means when such first signal is received by the second means. The next step is transmitting such reverse phase signal for a predetermined radius from the second predetermined location while the position of the ignition switch is on and preventing any cellular telephone transmission substantially within the predetermined radius while the reverse phase signal is being transmitted.

Still another alternative embodiment of the invention provides in combination with a cellular telephone, the improvement comprises a first means disposed one of on and within such cellular telephone for transmitting a short range signal for a distance of up to about 3 feet, a method for preventing a driver of a motor vehicle from using said cellular telephone while such motor vehicle is in a mode which would enable such motor vehicle to move into one of a forward motion and a reverse motion. The method comprises the steps of determining a position of a gear shift lever disposed in a first predetermined location on the motor vehicle and generating a first signal when the gear shift lever is moved to and remains in a position which will allow the motor vehicle to move into one of a forward motion and a reverse motion. There is the step of transmitting the first signal to a receiver and signal generating means that is disposed in a second predetermined location on the motor vehicle. There is a second signal transmitted by the means disposed one of on and within such cellular telephone to the receiver and signal generating means thereby activating the receiver and signal generating means which had previously been enabled to generate a third signal. There is a step of generating the third signal when the first signal and the second signal are both received by the receiver and signal generating means and transmitting the third signal to a message unit. Such message unit transmits a message to such cellular telephone disposed within a predetermined radius telling the cellular telephone user to remove the cellular telephone from such driver's area of such motor vehicle. Such receiver and signal generating means also transmits the third signal to a phase reversal transmitter, disposed in a third predetermined location, for transmitting a reverse phase signal for such predetermined radius from such third predetermined location. There is a step of transmitting such reverse phase signal for such predetermined radius from the third predetermined location by the phase reversal transmitter and thus, preventing cellular telephone transmission within the predetermined radius while such cellular telephone is within the predetermined radius and the phase reversal generator is transmitting such reverse phase signal.

Yet another alternative embodiment of the invention provides in combination with a cellular telephone, the improvement comprises a first means disposed one of on and within such cellular telephone for transmitting a short range signal for a distance of up to about 3 feet, a method for preventing a driver of a motor vehicle from using such cellular telephone while such motor vehicle is in a mode which would enable such motor vehicle to move into one of a forward motion and a reverse motion. The method comprises the steps of determining a position of an ignition switch disposed in a first predetermined location on the motor vehicle and generating a first signal when the position of the ignition switch is moved to an on position. There is the step of transmitting the first signal to a receiver and signal generating means that is disposed in a second predetermined location on the motor vehicle. There is a second signal transmitted by the means disposed one of on and within such cellular telephone to the receiver and signal generating means thereby activating the receiver and signal generating means which had previously been enabled to generate a third signal. There is a step of generating the third signal when the first signal and the second signal are both received by the receiver and signal generating means and transmitting the third signal to a message unit. Such message unit transmits a message to such cellular telephone disposed within a predetermined radius telling the cellular telephone user to remove the cellular telephone from such driver's area of such motor vehicle. Such receiver and signal generating means also transmits the third signal to a phase reversal transmitter, disposed in a third predetermined location, for transmitting a reverse phase signal for such predetermined radius from such third predetermined location. There is a step of transmitting such reverse phase signal for such predetermined radius from the third predetermined location by the phase reversal transmitter and thus, preventing cellular telephone transmission within the predetermined radius while such cellular telephone is within the predetermined radius and the phase reversal generator is transmitting such reverse phase signal.

In still yet another alternative embodiment of the invention there is provided an apparatus, in combination with a device disposed one of on and within a cellular telephone for transmitting a low powered signal for a predetermined distance, for preventing a motor vehicle driver from using such cellular telephone while such motor vehicle is in one of a forward motion and a reverse motion. The apparatus comprises a first means disposed in a first predetermined location on such motor vehicle for determining a position of a gear shift lever of such motor vehicle and for generating and transmitting a first signal when such position of such gear shift lever is moved to and remains at one which would allow such motor vehicle to move in one of a forward motion and a reverse motion. There is a receiver and signal generating means disposed in a second predetermined location on the motor vehicle for receiving such first signal thereby enabling the receiver and signal generating means to generate a second signal and for receiving such low powered signal transmitted by the device when such cellular telephone is disposed within a predetermined radius, thereby activating the receiver and signal generating means for generating such second signal when such first signal and such low powered signal are both received by the receiver and signal generating means. A message unit is disposed in a third predetermined location for receiving such second signal and for transmitting a message to such cellular telephone, that is disposed within the predetermined radius, telling such cellular telephone user to remove such cellular telephone from such driver's area of such motor vehicle. A phase reversal generator and transmitter is disposed on such motor vehicle at a fourth predetermined location for receiving such second signal transmitted by such receiver and signal generating means and for generating and transmitting a reverse phase power output signal for a predetermined radius when the phase reversal generator and transmitter is activated by such second signal wherein such predetermined radius of the reverse phase power output signal from such phase reversal generator and transmitter is at least sufficient to prevent any cellular telephone transmission within the predetermined radius when the phase reversal transmitter and generator is transmitting such reverse phase power output signal.

OBJECTS OF THE INVENTION

It is, therefore, one of the primary objects of the present invention to provide a method and apparatus which will prevent a cell phone from being used by a driver of a motor vehicle while such vehicle is in motion.

Another object of the present invention is to provide a method for preventing a cell phone from being used by a driver of a motor vehicle while such vehicle is in motion that does not require modification of the cell phone.

Still another object of the present invention is to provide a method for preventing a cell phone from being used by a driver of a motor vehicle while such vehicle is in motion that will not affect cell phone usage by others in the car.

Yet another object of the present invention is to provide an apparatus which could be mounted in a motor vehicle and prevent the use of a cell phone by the driver while the vehicle is in motion.

An additional object of the present invention is to provide a cellular telephone equipped to transmit a short range signal which can be used in conjunction with other equipment on a motor vehicle to prevent use of such cellular telephone by the driver of such motor vehicle.

In addition to the numerous objects and advantages of the present invention which have been described with some degree of particularity above, it should be both noted and understood that a number of other important objects and advantages of the method and apparatus for preventing the use of cell phones in moving motor vehicles will become more readily apparent to those persons who are skilled in the relevant art from the following more detailed description of the invention, particularly, when such detailed description is taken in conjunction with the attached drawing Figures and the appended claims.

BRIEF DESCRIPTION OF THE PRESENTLY PREFERRED AND VARIOUS ALTERNATIVE EMBODIMENTS OF THE PRESENT INVENTION

Figure 1:
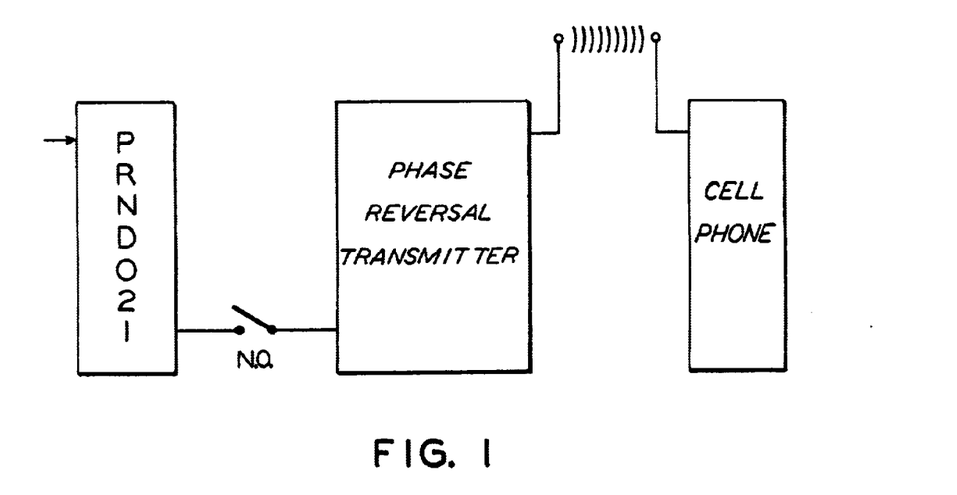
FIG. 1 is a block diagram illustrating a presently preferred embodiment of an apparatus according to the invention for preventing cell phone usage in a vehicle while such vehicle is in motion.

Reference is now, more particularly, made to FIG. 1. Illustrated therein is a block diagram of a first embodiment of the invention for a method which would prevent the driver of a motor vehicle from using a cell phone while the vehicle is in motion. This embodiment would not require any modification to the cell phone. The apparatus or device for preventing such cell phone use could be mounted in one of the dashboard, floorboard, door and ceiling area of the motor vehicle.

As used in the present application, the term motor vehicle is meant to at least include automobiles, vans, trucks, motor homes, semi-tractor trailers, construction vehicles, motorcycles and boats.

A first step in the method involves determining the position of the gear shift lever disposed in a first predetermined location on such motor vehicle and generating a first signal when the position of such gear shift lever is moved to and remains in a position that is indicative of permitting the vehicle to move in any direction. This would be essentially one of drive, overdrive, second, low and reverse.

This is followed by the step of transmitting such first signal to a means disposed in a second predetermined location on such motor vehicle for generating and transmitting a reverse phase signal. As mentioned previously such second predetermined location for such means is one of the dashboard, steering column, floorboard, sidewall, door and ceiling area of the motor vehicle.

It is presently preferred that such means for transmitting a reverse phase signal be a phase reversal generator and transmitter and that it be mounted on the dashboard and preferably on the driver's side of the dashboard. Further, it is presently preferred that such driver's side of the dashboard be located in a position between the steering column and the driver's door.

The normally open circuit is closed and such first signal is transmitted indicating that the gear shift lever has been moved to one of the engaged positions. The circuit is open when the gear shift lever is in the position of park or neutral and thus, no signal is transmitted. The description for this embodiment and subsequent embodiments describes the function with a vehicle equipped with an automatic transmission.

However, the function would be the same if the vehicle were equipped with a standard transmission. There just wouldn't be a park position with the standard transmission.

There is next a step of generating such reverse phase signal when such first signal, indicating that the gear shift lever is in an engaged position, is received by such phase reversal transmitter. This is followed by a step of transmitting such reverse phase signal generated in the previous step, for a predetermined radius.

The last step includes preventing any cellular telephone transmission by any cellular telephone that is within such predetermined radius. Any attempted cellular telephone transmission would automatically cease when the cellular telephone picked up the reverse phase frequency signal that was transmitted by the phase reversal transmitter. The reverse phase frequency signal transmitted by the phase reversal transmitter is transmitted at a frequency that is substantially 180 degrees out of phase from the particular frequency being used by cellular telephones.

In a presently preferred embodiment of the invention such predetermined radius is about 3 feet. This radius is designed to prevent usage of the cell phone by a driver since such radius would include the driver's area of the car but would not extend beyond the driver's area so as to not affect the usage of a cell phone by any other occupants that might be in the car. This radius is based on the installation of the phase reversal transmitter in the presently preferred position of the driver's side of the dashboard.

In this way the 3 foot radius would only encompass the driver. The preferred radius may be adjusted if the transmitter is positioned elsewhere since the primary object is to prevent the use of the cellular telephone by the driver while the vehicle is in motion but still not prevent others in the car from using a cellular telephone.

The prevention of cell phone usage is accomplished by the reversed phase signal that is 180 degrees out of phase from the frequency used by cellular telephones. This out of phase frequency, once picked up by the cellular telephone's microphone, would eliminate the carrier frequency and thus prevent any transmission. This would not disrupt any reception, it would only disrupt transmission.

Cellular telephone makers could redesign their cellular telephones so such cell phones could provide a message that would inform the driver what is happening and why this is happening.

An alternate embodiment of the present invention would include an additional step of monitoring the occupants of the car to determine if the driver is the only occupant. This could be determined by one of a seat belt system and a seat sensing system.

If it is sensed that the vehicle is occupied by only the driver then the power output of the reversed phase frequency signal, which would determine the radius that would be affected, could be increased to include the entire seating area.

Another alternate embodiment of the present invention could also include a modification which could encompass shutting down such cellular telephone even if the car is in neutral but is coasting and the car is moving. In this alternate embodiment the phase reversal transmitter would be activated merely by turning on the ignition.

Figure 2:
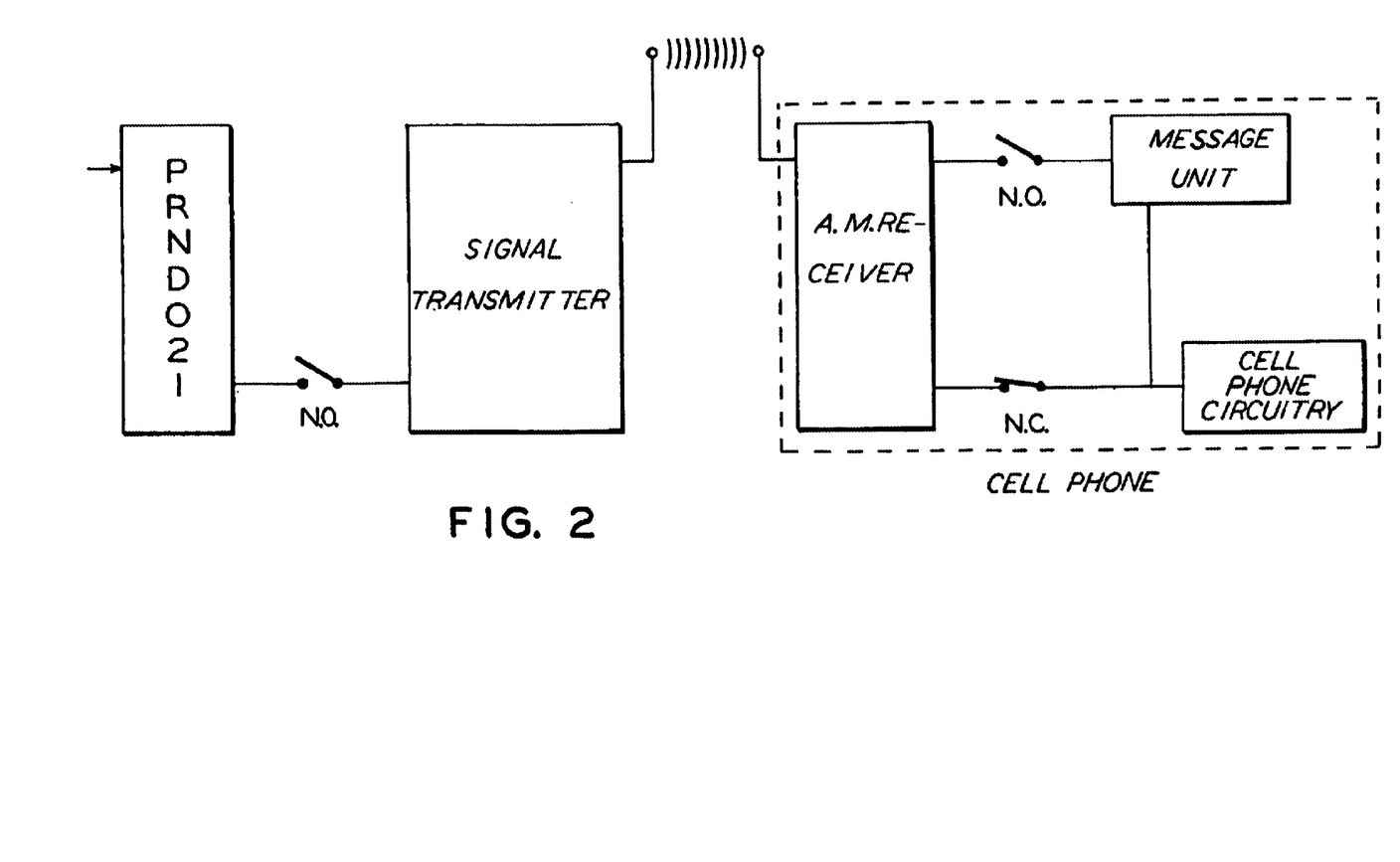
FIG. 2 is a block diagram which illustrates an alternative embodiment of the present invention.

A second embodiment of the invention, illustrated in drawing FIG. 2, would require a modification or a newly designed cellular telephone. This embodiment would also include a first step of determining the position of the gear shift lever disposed in a first predetermined location on the motor vehicle and generating a first signal when the position of such gear shift lever is moved to and remains at one of drive, overdrive, second, low and reverse. As with the previous embodiment there is no signal transmitted when the shift lever is in park or neutral. There is a step of transmitting such first signal to a receiving and transmitting means disposed in a second predetermined location on such motor vehicle for generating a second signal.

A next step includes generating such second signal when such first signal, indicating that the gear shift is in an engaged position, is received. Such receiving and transmitting means is located in one of the dashboard, driver's door, steering column, floorboard, sideboard and ceiling area of such motor vehicle. It is presently preferred that such receiving and transmitting means be located in the driver's side of the dashboard.

Another step includes transmitting such second signal from the receiving and transmitting means for a predetermined radius from such predetermined location. Such second signal may be transmitted by means of an AM transmitter, FM transmitter, and signal generator. It is presently preferred that such second signal be transmitted by an AM transmitter.

It is also presently preferred that such predetermined radius be such that it covers the driver's area of the car. It is presently preferred that such radius be generally about 3 feet when such signal transmitter is located in the preferred driver's side of the dashboard. The predetermined radius may have to be adjusted if the signal transmitter is located elsewhere.

Another step includes receiving such second signal by an AM receiver section of a cellular telephone and a final step involves preventing any transmission by any cellular telephone that is within the predetermined radius. Cellular telephone transmission is prevented when such second signal transmitted by the AM signal transmitter is received by the AM receiver section of such cellular telephone. Again, this only occurs when the position of such gear shift lever is moved to one of an engaged position of drive, overdrive, second, low and reverse.

As with the first embodiment such disruption would only affect transmission from the cell phone but would not disrupt reception of incoming signals. Also, the cell phone circuitry may be modified so as to transmit a message to the user explaining why the transmission was interrupted.

It is also presently preferred that such second signal, transmitted by the AM signal transmitter when the position of the gear shift lever is in an engaged position, is a hi-pitched signal. It is preferred that this hi-pitched signal is at a frequency that is higher than the range detectable by humans or pets.

Another embodiment, illustrated in the block diagram of FIG. 1, of the invention provides an apparatus for preventing a motor vehicle driver from using a cell phone while such motor vehicle is in motion. Such apparatus comprises a first means disposed on such motor vehicle for determining a position of the gear shift lever of such motor vehicle and transmitting a first signal when the position of the gear shift lever is moved to one indicative of permitting such vehicle to move in any direction. This would be essentially one of drive, overdrive, second, low and reverse. As described previously no signal is transmitted when the shift lever is in park.

The apparatus further includes a phase reversal transmitter that is in electrical communication with the first means for determining the position of the gear shift lever of such motor vehicle. The phase reversal transmitter may be mounted on one of a dashboard, floorboard, door, steering column, floorboard, sideboard and ceiling of such motor vehicle. It is presently preferred that such phase reversal transmitter be mounted on the dashboard and preferably on the driver's side of the dashboard.

Such phase reversal transmitter is activated when such first means for determining the position of the gear shift lever transmits such first signal indicating that the position of the gear shift lever has been moved to a position which would enable such motor vehicle to move.

The apparatus further includes a second means disposed either closely adjacent or on the phase reversal transmitter for controlling transmission of a power output signal of the phase reversal transmitter so as to transmit such power output signal for a predetermined radius. In the preferred embodiment of the invention such predetermined radius is generally about 3 feet provided that such phase reversal transmitter is located in the preferred location of the driver's side of the dashboard.

Such 3 foot radius would prevent any cell phone transmission from anyone in the drivers seat while still permitting the cell phone to be used by other occupants of the vehicle. The predetermined radius could be adjusted if such phase reversal transmitter were positioned in another location.

The power output signal of the phase reversal transmitter prevents any cell phone transmission within the predetermined radius when the phase reversal transmitter is transmitting the power output signal. It is presently preferred that such frequency signal transmitted by the phase reversal transmitter be about 180 degrees out of phase from the frequency being used by cell phones.

Figure 3:
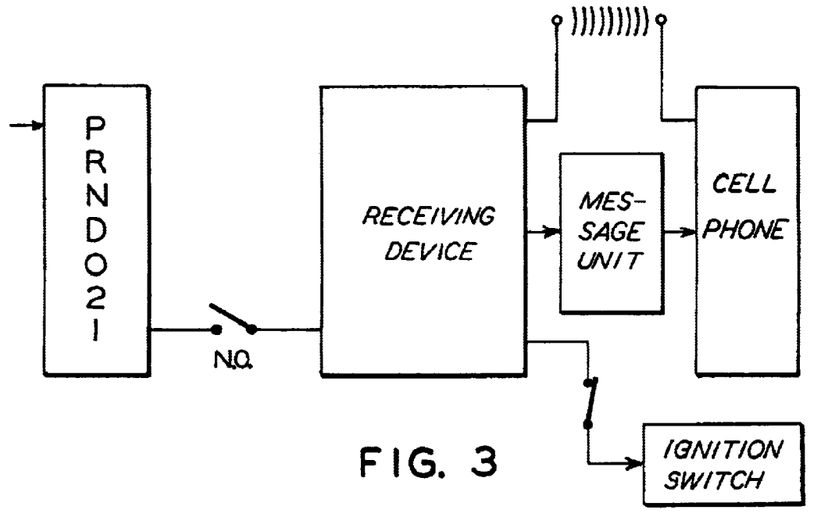
FIG. 3 is a block diagram illustrating still another alternative embodiment of the present invention.

In still another embodiment, illustrated in FIG. 3, of the invention there is provided a method for preventing cellular telephone usage while the motor vehicle is in motion. A first step in the method involves determining the position of the gear shift lever on the motor vehicle and generating a first signal when the position of such gear shift lever is moved to one indicative of permitting the vehicle to move in any direction. This would essentially be one of drive, overdrive, second, low and reverse.

Another step involves transmitting such first signal, generated in the previous step, to a receiving and transmitting means disposed in a predetermined location in such motor vehicle for enabling the receiving and transmitting means to generate a second signal when the receiving and transmitting means also receives a third signal that a cellular telephone within a predetermined radius is transmitting. Such receiving and transmitting means requires both the first signal indicating that the gear shift lever of the motor vehicle is in an engaged position and the third signal that a cellular telephone is transmitting before it is activated to generate the second signal.

A next step is transmitting such second signal, generated previously, for a predetermined radius from the predetermined location of such receiving and transmitting means with a message to such cellular telephone that is transmitting that within a predetermined time period either the cellular telephone transmission must cease or such receiving and transmitting means will shut down the motor vehicle.

A final step would be shutting down such motor vehicle if the cellular telephone transmission has not ceased within such predetermined time period.

It should be noted, as described above, that such receiving and transmitting means is not activated when it only receives the first signal that the gear shift lever has moved to an engaged position, nor is it activated when it only receives such third signal that the cellular telephone is transmitting. Activation, that is generating and transmitting a coded signal, only occurs when both of these signals are received by the receiving and transmitting means.

As with the other embodiments it is presently preferred that such radius be about 3 feet so as to encompass only the driver's area of the automobile and it is also presently preferred that such receiving and transmitting means be located in the driver's side of the dashboard.

The above invention could be accomplished with cellular telephones that are currently produced. However, with newly designed phones it would be possible to shut the cell phone down for a predetermined period of time before they could be restarted. Cellular telephones could receive but be unable to transmit.

Figure 4:
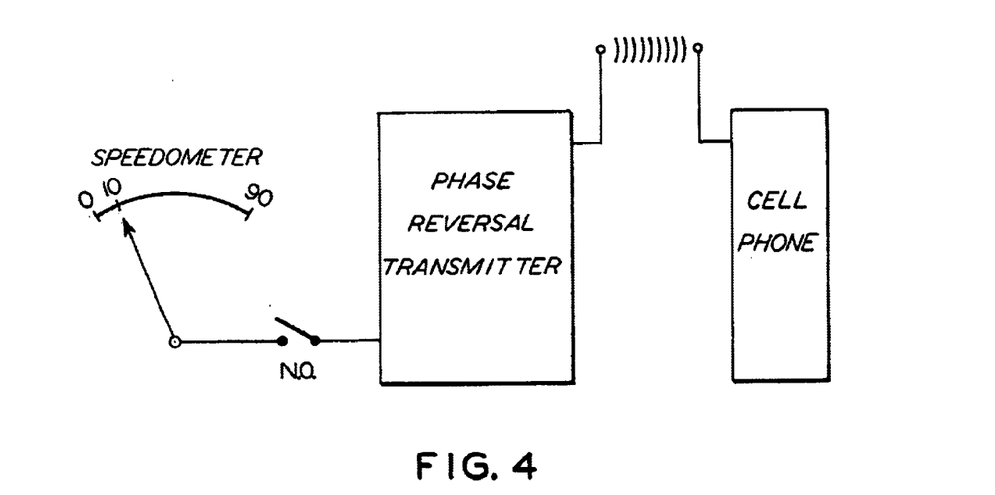
FIG. 4 is a block diagram illustrating yet another alternative embodiment of the present invention.

In still yet another embodiment of the invention, illustrated in FIG. 4, such method would permit usage of such cellular telephones at predetermined relatively low speeds.

This method would be similar to the first embodiment. A first step would involve determining a speed of such motor vehicle. The speed could be determined by any one of a tachometer, venturi, vacuum sensor, wheel speed sensor, global positioning sensor and speedometer. In a presently preferred embodiment of the invention such speed is determined by a speedometer.

Another step in the method would involve generating a first signal when it is detected that the speed of such motor vehicle exceeds a predetermined speed. It is presently preferred that such predetermined speed be in the range of generally between about 5 and about 15 miles per hour.

Another step includes transmitting such first signal, generated in a previous step, to a phase reversal transmitter disposed in a predetermined location on such motor vehicle for generating a reverse phase frequency signal. A next step would be generating such reverse phase signal when such first signal is received by the phase reversal transmitter.

Another step would involve transmitting such reverse phase signal, generated above, by such phase reversal transmitter for a predetermined radius from its predetermined location and finally the step of preventing any cellular telephone transmission from any cellular telephone that is substantially within the predetermined radius while the reverse phase signal is being transmitted.

It is a presently preferred that such predetermined radius be about 3 feet. This radius is designed to prevent any cell phone transmission by a driver of the motor vehicle but would not extend beyond so as to not prevent cell phone transmission by passengers that might be in the car. The preferred radius is based on the phase reversal transmitter being positioned in the preferred location of such driver's side of the dashboard. The radius could be adjusted if the transmitter is located elsewhere. In still another alternate embodiment of the invention, illustrated in the block diagram of FIG. 5, there is provided an apparatus for preventing a motor vehicle driver from using a cell phone while such motor vehicle is in motion.

Figure 5:
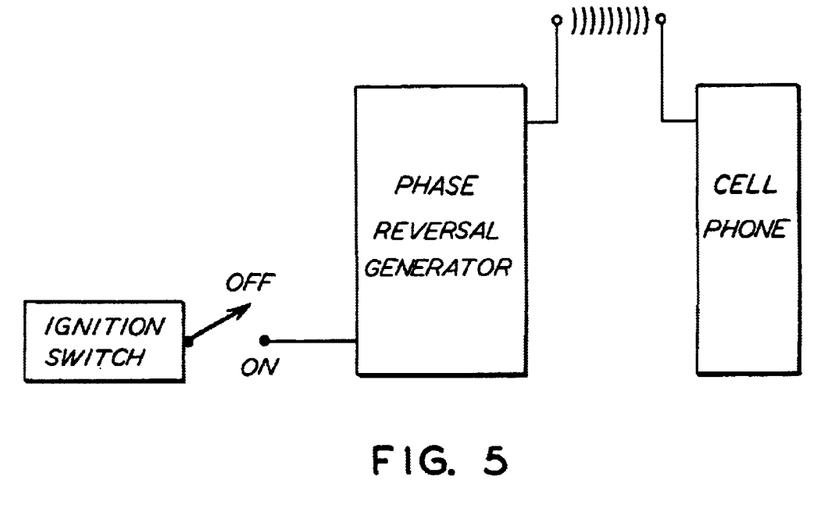
FIG. 5 is a block diagram illustrating still another alternative embodiment of the present invention.

Such apparatus comprises a first means disposed in a first predetermined location on said motor vehicle for determining the position of one of a gear shift lever and an ignition switch and for generating a first signal when such position of one of such gear shift lever is moved to and remains in a position, determined in previous step, which will allow such motor vehicle to move into one of a forward motion and a reverse motion and such ignition switch is moved to an on position.

There is a step of transmitting such first signal to a means disposed in a second predetermined location on said motor vehicle for generating a reverse phase signal.

The next step is generating such reverse phase signal when the first signal, transmitted previously, is received by the means for generating such reverse phase signal and then transmitting such reverse phase signal for a predetermined radius from the second predetermined location while the position of one of such gear shift lever remains in a position indicative of permitting such vehicle to move in any direction and such ignition switch is still in an on position.

The final step is preventing any cellular telephone transmission substantially within the predetermined radius while the reverse phase signal is being transmitted by the phase reversal transmitter.

The most restrictive method of activating the system would be to have such system activated when the ignition switch is moved to the on position. In this mode as soon as the ignition switch is turned on the phase reversal generator, or any of the other modes of generating a signal, would be active. Then as soon as the cellular phone was energized, within the predetermined distance, cellular transmission would be prevented. This essentially means that if anyone located in the drivers seat of the car tried to use the cellular telephone they would be unable to transmit. It is presently preferred that the mode of energizing the phase reversal transmitter, or any of the other alternative modes described, is the position of the gear shift lever.

Figure 6:
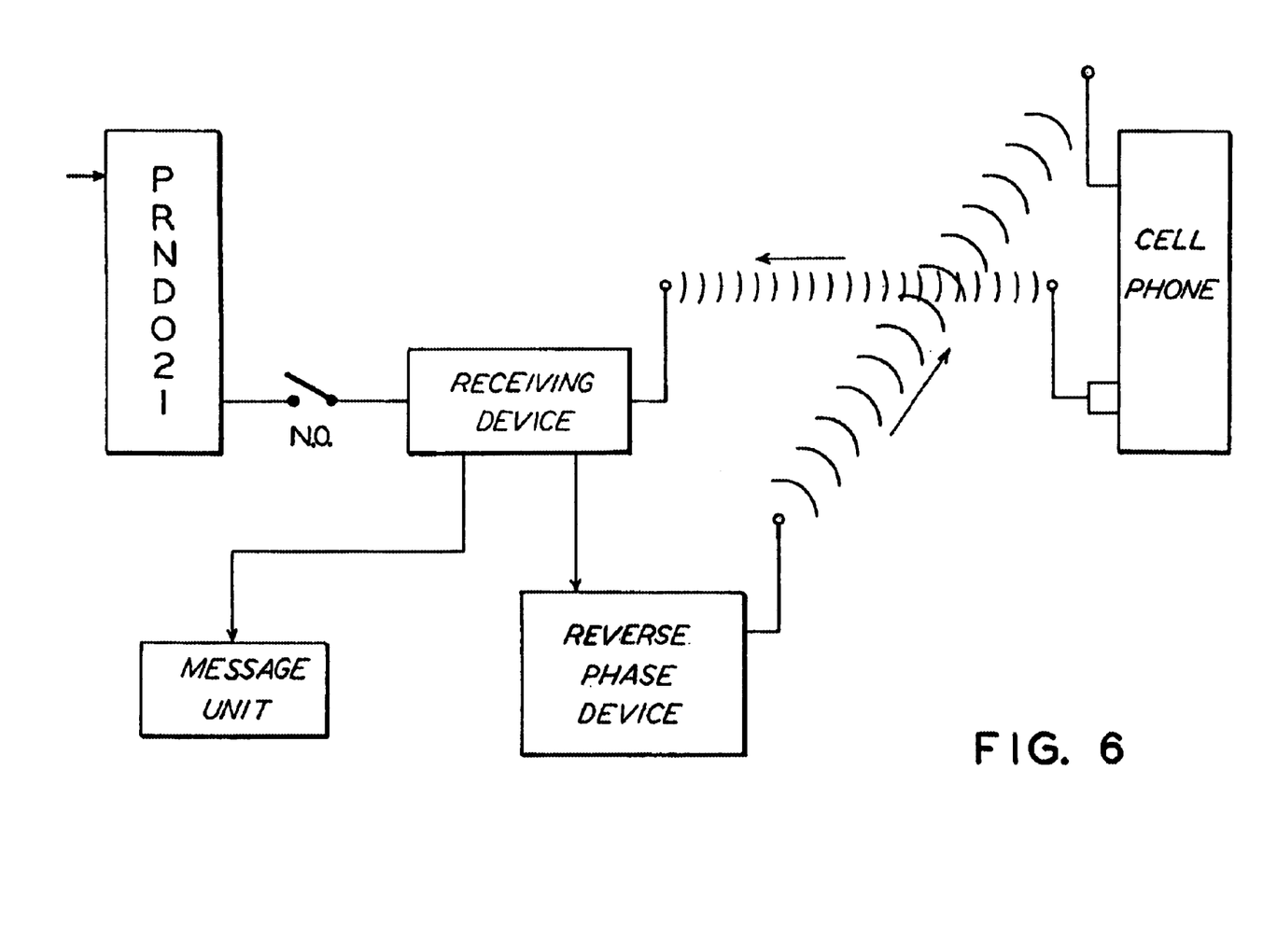
FIG. 6 is a block diagram illustrating yet still another alternative embodiment of the present invention.
Figure 7:
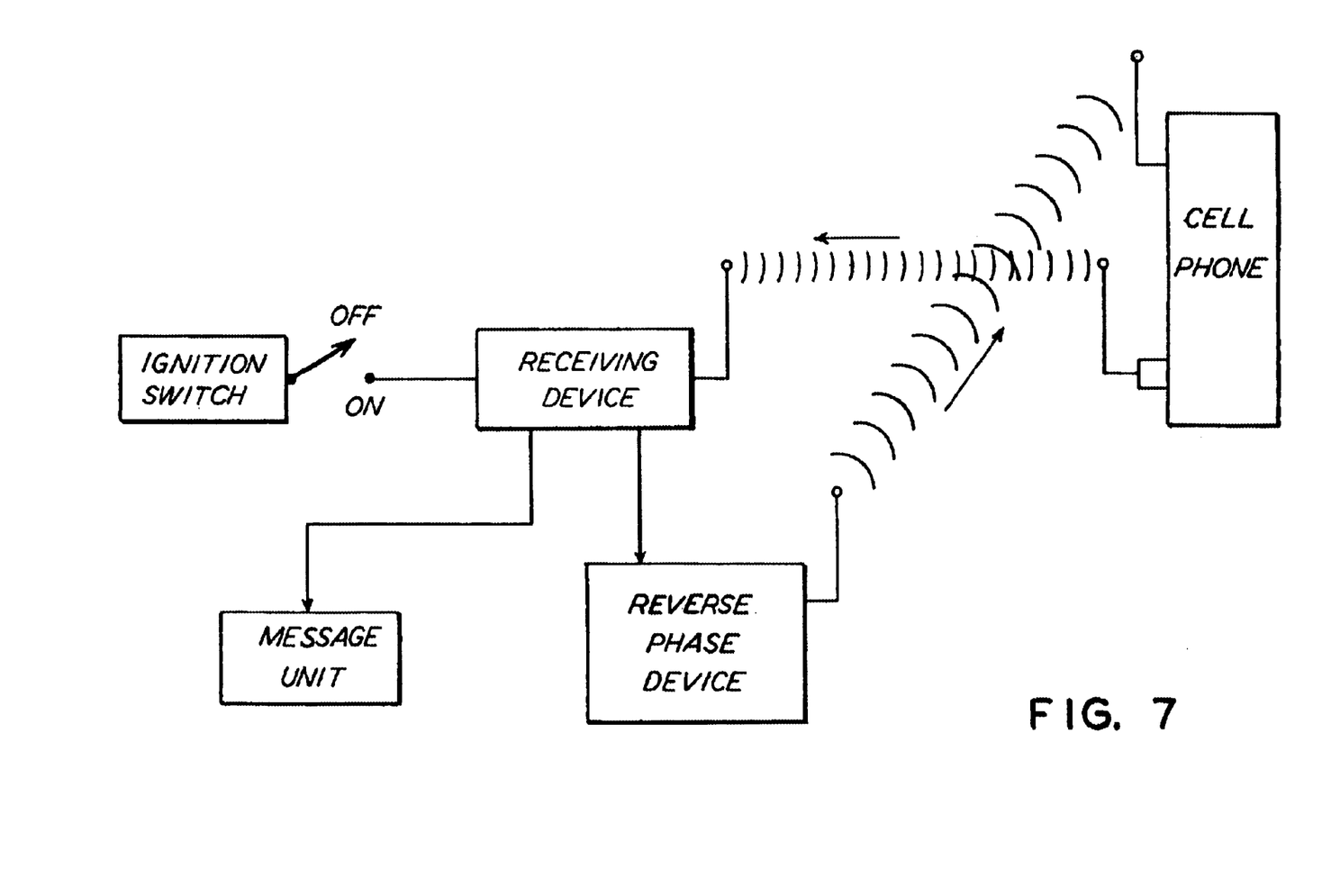
FIG. 7 is a block diagram illustrating still yet another alternative embodiment of the present invention.

Reference is now made, more particularly to FIGS. 6 and 7. Illustrated therein are yet other alternative embodiments of the instant invention to provide a method for preventing the use of a cellular telephone by a driver of a motor vehicle while such motor vehicle is in motion. These embodiments utilize a newly designed cellular phone in combination with some of the embodiments described previously.

In combination with a cellular telephone used for wireless communication the improvement comprising a first means or device disposed one of on and within such cellular telephone for transmitting a short range signal for a distance of up to about 3 feet, the signal activates a second means that is disposed closely adjacent a driver of a motor vehicle for generating and transmitting a signal which will prevent cellular telephone transmission. The means or device disposed either on or within such cellular telephone transmits a short range signal for a distance of up to about 3 feet. This signal transmitted by such device would be a special low power output signal. This short range signal is in addition to the regular signal transmitted when the cellular telephone is being used.

The low power short range signal would travel only a predetermined radius when power is applied to the cellular telephone. It is presently preferred that such predetermined radius be substantially 3 feet. It is also preferred that such low output signal generated by the device on or within the cellular telephone be an infrared or an ultrasonic signal.

In the method for preventing cellular telephone transmission while the vehicle is enabled to move in any direction, a receiver and signal generating means is tuned to pick up the low power output signal generated by the newly designed cellular telephone. Such receiver and signal generating means would be activated as soon as one of the vehicle's ignition switch is turned on and the gear shift lever is moved to a position which would enable such motor vehicle to move in any direction.

It is presently preferred that such activation means be the movement of the gear shift lever to a position which would enable the vehicle to move in any direction, i.e. drive, overdrive, reverse, second and low.

As soon as the special low power output signal, which travels only about 3 feet, is received by the receiver and signal generating means which had been previously activated by the signal indicating movement of the gear shift lever or such ignition switch being turned on, such receiver and signal generating means would activate a message unit or a recorder means that would inform the driver that such driver is not permitted to use a cellular telephone while driving such motor vehicle and that such cellular telephone call will not be transmitted. In addition the message would inform the driver to place the cellular telephone at least 3 feet away from the drivers seat or the message would continue.

The receiver and signal generating means, when activated by the movement of the gear shift lever or the ignition switch and the receipt of such special low power output signal from such cellular telephone, would also send a signal that activates a phase reversal transmitter which in turn transmits a reverse phase signal which will prevent any transmission by such cellular telephone.

The receiver and signal generating means could be disposed in any of the following locations on the driver's side of the motor vehicle: dashboard, ceiling, door, floorboard, sidewall and steering column. In the presently preferred embodiment of the invention such receiver and signal generating means is disposed in the dashboard and preferably between the steering column and the door. It is also presently preferred that such receiver and signal generating means be disposed either on or closely adjacent such phase reversal transmitter.

One big advantage of this embodiment of the invention is that the driver would receive a message informing him of the consequences as soon as a powered telephone is placed in the driver's area of such motor vehicle and before the driver tries to do the most distracting thing with the cellular telephone and that thing is dialing.

Such newly designed cellular telephone would be modified by such means that sends out the special low power signal as soon as power is applied to it. Such special signal is an infrared or ultrasonic signal. The special signal would not interfere with the regular functions of the cellular phone. The emitted special signal would only travel substantially 3 feet and thus would not interfere with the use of the cellular telephone by anyone who was not sitting in the driver's seat. The receiver and signal generating means, preferably located in the driver's side of the dashboard, would receive this special signal when the cellular telephone was within this three foot distance.

The receiver and signal generating means would be activated by either movement of the gear shift lever to an engaged position or such ignition switch being turned on and would thereby activate a phase reversal transmitter which would generate and transmit a reverse phase signal which would prevent transmission from the cellular telephone.

In still another alternate embodiment of the means, disposed one of on or within newly designed cellular telephones, that transmits such special low powered signal, a special signal transmitter could be adapted to be secured to existing telephones. The power to operate this transmitter could be supplied by the cellular telephones batteries. In this mode such equipment is a separate device but a cell phone user would be required to have this device installed on the cell phone.

Illustrated in FIGS. 6 and 7 is yet another alternate embodiment of the invention. In this embodiment an apparatus is in combination with a device, disposed one of on and within a cellular telephone for transmitting a low powered signal for a predetermined distance, for preventing a motor vehicle driver from using such cellular telephone while such motor vehicle is in one of a forward motion and a reverse motion.

The apparatus comprises a first means disposed in a first predetermined location on such motor vehicle for determining a position of a gear shift lever of such motor vehicle and for generating and transmitting a first signal when such position of such gear shift lever is moved to and remains at one which would allow such motor vehicle to move in one of a forward motion and a reverse motion.

There is a receiver and signal generating means disposed in a second predetermined location on the motor vehicle for receiving the first signal thereby enabling the receiver and signal generating means to generate a second signal and for receiving such low powered signal transmitted by the device when such cellular telephone is disposed within a predetermined radius, thereby activating the receiver and signal generating means. Such receiver and signal generating means is activated when such first signal and such low powered signal are both received by the receiver and signal generating means. Both signals are necessary.

There is a message unit that is disposed in a third predetermined location. The message unit receives such second signal and transmits a message to such cellular telephone that is disposed within such predetermined radius. The message tells such cellular telephone user to remove such cellular telephone from such driver's area of such motor vehicle or the message will continue.

A phase reversal generator and transmitter is disposed on such motor vehicle at a fourth predetermined location. Such phase reversal generator also receives the second signal transmitted by said receiver and signal generating means and generates and transmits a reverse phase power output signal for a predetermined radius. This reverse phase output signal is transmitted when the phase reversal generator and transmitter is activated by the second signal wherein the predetermined radius of the reverse phase power output signal is at least sufficient to prevent any cellular telephone transmission within this predetermined radius while the phase reversal transmitter is transmitting such reverse phase power output signal.

It is presently preferred that this predetermined radius is about 3 feet. This radius would prevent anyone in the driver's seat from using a cellular telephone while permitting anyone seated elsewhere in the motor vehicle to use the cellular telephone.

While a presently preferred embodiment and various alternate embodiments of the present invention has been described in detail above, it should be understood that various other adaptations and/or modifications of the invention can be made by those persons who are particularly skilled in the art related to cell phones without departing from either the spirit of the invention or the scope of the appended claims.

I claim:

1. A method for preventing a driver of a motor vehicle from using a cellular telephone while said motor vehicle is in one of a forward motion and a reverse motion, said method comprising the steps of:
   (a) determining a position of a gear shift lever disposed in a first predetermined location on said motor vehicle;
   (b) generating a first signal when said gear shift lever is moved to and remains in a position, determined in step (a), which will allow said motor vehicle to move into said one of said forward motion and said reverse motion;
   (c) transmitting said first signal, generated in step (b), to a means disposed in a second predetermined location on said motor vehicle for generating a reverse phase signal;
   (d) generating said reverse phase signal when said first signal, transmitted in step (c), is received by said means for generating said reverse phase signal;
   (e) transmitting said reverse phase signal, generated in step (d), for a predetermined radius from said second predetermined location while said position of said gear shift lever, detected in step (a) remains in said one of said forward motion and said reverse motion; and
   (f) preventing any cellular telephone transmission substantially within said predetermined radius while said reverse phase signal is being transmitted in step (e).

2. A method for preventing a motor vehicle driver from using a cellular telephone, according to claim 1, wherein said method includes the step of using a phase reversal transmitter in step (d) for generating said reverse phase signal.

3. A method for preventing a motor vehicle driver from using a cellular telephone, according to claim 2, wherein said method includes the step of using a frequency that is 180 degrees out of phase from a frequency used by cellular telephones for transmitting said reverse phase signal generated by said phase reversal transmitter, in step (e).

4. A method for preventing a motor vehicle driver from using a cellular telephone, according to claim 1, wherein said method includes a step of using a predetermined radius of generally about 3 feet for transmitting said reverse phase signal, in step (e).

5. A method for preventing a motor vehicle driver from using a cellular telephone, according to claim 1, wherein said method includes a step of using one of a dashboard, door and ceiling area of such motor vehicle as said second predetermined location for generating said phase reverse signal in step (d).

6. A method for preventing a motor vehicle driver from using a cellular telephone, according to claim 1, wherein said method further includes a step of monitoring occupants of such motor vehicle by one of a seat belt system and a seat sensing system.

7. A method for preventing a motor vehicle driver from using a cellular telephone, according to claim 6, wherein said method further includes an additional step of using an increased power output of said reverse phase signal to include an entire seating area of such motor vehicle when said step of monitoring occupants of such vehicle indicates that only a driver is present in such motor vehicle.

8. A method for preventing a driver of a motor vehicle from using a cellular telephone while said motor vehicle is in one of a forward motion and a reverse motion, said method comprising the steps of:

(a) determining a position of a gear shift lever disposed in a first predetermined location on said motor vehicle;

(b) generating a first signal when said gear shift lever is moved to and remains in a position, determined in step (a), which will allow said motor vehicle to move into said one of said forward motion and said reverse motion;

(c) transmitting said first signal, generated in step (b), to a receiving and transmitting means disposed in a second predetermined location on said motor vehicle for generating a second signal recognized only by such cell phone;

(d) generating said second signal when said first signal, transmitted in step (c), is received by said receiving and transmitting means;

(e) transmitting said second signal, generated in step (d), for a predetermined radius from said second predetermined location;

(f) receiving said second signal, transmitted in step (e), by an AM receiver section of a cellular telephone; and (g) preventing any cellular telephone transmission substantially within said predetermined radius while said second signal is being received by said AM receiver section of such cellular telephone in step (e).

9. A method for preventing a motor vehicle driver from using a cellular telephone, according to claim 8, wherein said method includes a step of using one of an AM transmitter, an FM transmitter and a signal generator for transmitting said second signal recognized only by such cell phone.

10. A method for preventing a motor vehicle driver from using a cellular telephone, according to claim 9, wherein said method includes a step of using an AM transmitter for transmitting said second signal.

11. A method for preventing a motor vehicle driver from using a cellular telephone, according to claim 8, wherein said method includes a step of using a relay mechanism placed in such cellular telephone for preventing cellular telephone transmission.

12. A method for preventing a motor vehicle driver from using a cellular telephone, according to claim 8, wherein said method includes a step of using a hi-pitched coded signal for transmitting said second signal in step (d).

13. An apparatus for preventing a motor vehicle driver from using a cellular telephone while such motor vehicle is in one of a forward motion and a reverse motion, said apparatus comprising:

(a) a first means disposed in a first predetermined location on such motor vehicle for determining a position of a gear shift lever of such motor vehicle and for generating and transmitting a first signal when such position of such gear shift lever is moved to and remains at one which would allow such motor vehicle to move in one of a forward motion and a reverse motion;

(b) a phase reversal generator and transmitter disposed on such motor vehicle at a second predetermined location for receiving said first signal transmitted by said first means and for generating and transmitting a reverse phase power output signal when said phase reversal generator and transmitter is activated by said first signal; and (d) a second means disposed for cooperation with said phase reversal generator and transmitter for controlling transmission of said reverse phase power output signal of said phase reversal generator and transmitter so as to transmit said reverse phase power output signal for a predetermined radius;

wherein said predetermined radius of said reverse phase power output signal from said phase reversal transmitter is at least sufficient to prevent any cellular telephone transmission within said predetermined radius when said phase reversal transmitter is transmitting said reverse phase power output signal.

14. An apparatus for preventing a motor vehicle driver from using a cellular telephone, according to claim 13, wherein said predetermined radius is generally about 3 feet.

15. An apparatus for preventing a motor vehicle driver from using a cellular telephone, according to claim 13, wherein said phase reversal transmitter transmits said reverse phase power output signal at a frequency that is 180 degrees out of phase from a frequency used by cellular telephones.

16. An apparatus for preventing a motor vehicle driver from using a cellular telephone, according to claim 15, wherein said predetermined location of said phase reversal transmitter is one of a dashboard, door and ceiling area of such motor vehicle.

17. An apparatus for preventing a motor vehicle driver from using a cellular telephone, according to claim 16, wherein said phase reversal transmitter is located in such dashboard.

18. An apparatus for preventing a motor vehicle driver from using a cellular telephone, according to claim 17, wherein said phase reversal transmitter is located in a driver's side of such dashboard generally intermediate a steering column and a driver's door of such motor vehicle.

19. A method for preventing a driver of a motor vehicle from using a cellular telephone while said motor vehicle is in one of a forward motion and a reverse motion, said method comprising the steps of:

(a) determining a position of a gear shift lever disposed in a first predetermined location on said motor vehicle;

(b) generating a first signal when said gear shift lever is moved to and remains in a position, determined in step (a), which will allow said motor vehicle to move into said one of said forward motion and said reverse motion;

(c) transmitting said first signal, generated in step (b), to a signal generating means disposed in a second predetermined location on said motor vehicle for enabling said signal generating means to generate a third signal;

(d) generating and transmitting a second signal from such cellular telephone, within a predetermined radius, to said signal generating means thereby activating said signal generating means which had been enabled in step (c) to generate said third signal when said signal generating means also receives said second signal that such cellular telephone, within a predetermined radius, is transmitting;

(e) generating said second signal when said first signal, transmitted in step (c), and said second signal, transmitted in step (d), are both received by said signal generating means for generating said second signal;

(f) transmitting said second signal, generated in step (f), for a predetermined radius from said second predetermined location with a message to such cellular telephone within said predetermined radius telling such cellular telephone user that within a predetermined time one of such driver must stop cellular telephone transmission and such motor vehicle would be shut down; and (g) shutting down such motor vehicle if such cellular telephone transmission has not ceased within said predetermined time.

20. A method for preventing a motor vehicle driver from using a cell phone while such motor vehicle is in motion, said method comprises:

(a) determining a speed of such motor vehicle;

(b) generating a first signal when such speed of such motor vehicle, determined in step (a), exceeds a predetermined speed;

(c) transmitting said first signal, generated in step (b), to a means disposed in a predetermined location on such motor vehicle for generating a reverse phase signal;

(d) generating said reverse phase signal when said first signal, transmitted in step (c), is received by said means for generating said reverse phase signal;

(e) transmitting said reverse phase signal, generated in step (d), for a predetermined radius from such predetermined location; and (f) preventing any cellular telephone transmission substantially within said predetermined radius while said reverse phase signal is being transmitted in step (e).

21. A method for preventing a motor vehicle driver from using a cell phone, according to claim 20, wherein said method includes a step of using one of a tachometer, venturi, vacuum sensor, wheel speed sensor, global positioning sensor and speedometer for determining a speed of such motor vehicle in step (a).

22. A method for preventing a motor vehicle driver from using a cell phone, according to claim 21, wherein said method includes a step of using a speedometer for determining a speed of such motor vehicle.

23. A method for preventing a motor vehicle driver from using a cell phone, according to claim 20, wherein said method includes a step of using a speed of between about 5 and about 15 miles per hour for generating said first signal.

24. In combination with a cellular telephone used for wireless communication, an improvement for use within a motor vehicle comprising a first means disposed one of on and within such cellular telephone for transmitting a short range signal for a distance of up to about 3 feet, said signal activating a reverse phase generating means disposed closely adjacent a driver of a motor vehicle for generating and transmitting a signal which will prevent cellular telephone transmission.

25. A method for preventing a driver of a motor vehicle from using a cellular telephone while such motor vehicle is in a mode which would enable such motor vehicle to move, said method comprising the steps of:

(a) determining a position of an ignition switch by a first means disposed in a first predetermined location on said motor vehicle;

(b) generating a first signal by said first means when such ignition switch, determined in step (a) is moved to an on position;

(c) transmitting said first signal, generated in step (b), to a second means disposed in a second predetermined location on said motor vehicle for generating a reverse phase signal;

(d) generating said reverse phase signal by said second means when said first signal, transmitted in step (c), is received by said second means;

(e) transmitting said reverse phase signal, generated in step (d), for a predetermined radius from said second predetermined location while said position of said ignition switch is on; and (f) preventing any cellular telephone transmission substantially within said predetermined radius while said reverse phase signal is being transmitted in step (e).

26. In combination with a cellular telephone, the improvement comprising a first means disposed one of on and within such cellular telephone for transmitting a short range signal for a distance of up to about 3 feet, a method for preventing a driver of a motor vehicle from using said cellular telephone while said motor vehicle is in a mode which would enable said motor vehicle to move into one of a forward motion and a reverse motion, said method comprising the steps of:

(a) determining a position of a gear shift lever disposed in a first predetermined location on said motor vehicle;

(b) generating a first signal when said gear shift lever is moved to and remains in a position, determined in step (a), which will allow said motor vehicle to move into said one of said forward motion and said reverse motion;

(c) transmitting said first signal, generated in step (b), to a receiver and signal generating means disposed in a second predetermined location on said motor vehicle;

(d) transmitting a second signal by said means disposed one of on and within said cellular telephone to said receiver and signal generating means thereby activating said receiver and signal generating means which had been enabled in step (c) to generate a third signal;

(e) generating said third signal when said first signal, transmitted in step (c), and said second signal, transmitted in step (d), are both received by said receiver and signal generating means;

(f) transmitting said third signal, generated in step (e), to a message unit for transmitting a message to said cellular telephone disposed within a predetermined radius telling said cellular telephone user to remove said cellular telephone from such driver's area of such motor vehicle and to a phase reversal transmitter, disposed in a third predetermined location, for transmitting a reverse phase signal for said predetermined radius from said third predetermined location;

(g) transmitting said reverse phase signal for said predetermined radius from said third predetermined location by said phase reversal transmitter; and (h) preventing cellular telephone transmission within said predetermined radius while said cellular telephone is within said predetermined radius and said phase reversal generator is transmitting said reverse phase signal.

27. In combination with a cellular telephone, the improvement comprising a first means disposed one of on and within such cellular telephone for transmitting a short range signal for a distance of up to about 3 feet, a method for preventing a driver of a motor vehicle from using said cellular telephone while said motor vehicle is in a mode which would enable said motor vehicle to move into one of a forward motion and a reverse motion, said method comprising the steps of:

(a) determining a position of an ignition switch disposed in a first predetermined location on said motor vehicle;

(b) generating a first signal when said position of said ignition switch determined in step (a) is moved to an on position;

(c) transmitting said first signal, generated in step (b), to a receiver and signal generating means disposed in a second predetermined location on said motor vehicle;

(d) transmitting a second signal by said means disposed one of on and within said cellular telephone to said receiver and signal generating means thereby activating said receiver and signal generating means which had been enabled in step (c) to generate a third signal;

(e) generating said third signal when said first signal, transmitted in step (c), and said second signal, transmitted in step (d), are both received by said receiver and signal generating means;

(f) transmitting said third signal, generated in step (e), to a message unit for transmitting a message to said cellular telephone disposed within a predetermined radius telling said cellular telephone user to remove said cellular telephone from such driver's area of such motor vehicle and to a phase reversal transmitter, disposed in a third predetermined location, for transmitting a reverse phase signal for said predetermined radius from said third predetermined location;

(g) transmitting said reverse phase signal for said predetermined radius from said third predetermined location by said phase reversal transmitter which had been activated by receiving said third signal in step (f); and (h) preventing cellular telephone transmission within said predetermined radius while said cellular telephone is within said predetermined radius and said phase reversal generator is transmitting said reverse phase signal.

28. An apparatus in combination with a device disposed one of on and within a cellular telephone for transmitting a low powered signal for a predetermined distance for preventing a motor vehicle driver from using such cellular telephone while such motor vehicle is in one of a forward motion and a reverse motion, said apparatus comprising:

(a) a first means disposed in a first predetermined location on such motor vehicle for determining a position of a gear shift lever of such motor vehicle and for generating and transmitting a first signal when such position of such gear shift lever is moved to and remains at one which would allow such motor vehicle to move in one of a forward motion and a reverse motion;

(b) a receiver and signal generating means disposed in a second predetermined location on said motor vehicle for receiving said first signal thereby enabling said receiver and signal generating means to generate a second signal and for receiving said low powered signal transmitted by said device when such cellular telephone is disposed within a predetermined radius, thereby activating said receiver and signal generating means for generating said second signal when said first signal and said low powered signal are both received by said receiver and signal generating means;

(c) a message unit disposed in a third predetermined location for receiving said second signal and for transmitting a message to such cellular telephone, disposed within said predetermined radius, telling such cellular telephone user to remove such cellular telephone from such driver's area of such motor vehicle;

(d) a phase reversal generator and transmitter disposed on such motor vehicle at a fourth predetermined location for receiving said second signal transmitted by said receiver and signal generating means and for generating and transmitting a reverse phase power output signal for a predetermined radius when said phase reversal generator and transmitter is activated by said second signal;

wherein said predetermined radius of said reverse phase power output signal from said phase reversal transmitter is at least sufficient to prevent any cellular telephone transmission within said predetermined radius when said phase reversal transmitter is transmitting said reverse phase power output signal.

\* \* \* \* \*